(12) United States Patent
Kinsey

(10) Patent No.: US 12,101,401 B2
(45) Date of Patent: Sep. 24, 2024

(54) DIGITAL FORGE SYSTEMS AND METHODS

(71) Applicant: Brax Kinsey, Stuggart (DE)

(72) Inventor: Brax Kinsey, Stuggart (DE)

(*) Notice: Subject to any disclaimer, the term of this patent is extended or adjusted under 35 U.S.C. 154(b) by 260 days.

(21) Appl. No.: 17/815,667

(22) Filed: Jul. 28, 2022

(65) Prior Publication Data
US 2024/0039716 A1    Feb. 1, 2024

(51) Int. Cl.
*H04L 9/08*    (2006.01)
*H04L 9/16*    (2006.01)

(52) U.S. Cl.
CPC .............. *H04L 9/0869* (2013.01); *H04L 9/16* (2013.01)

(58) Field of Classification Search
CPC . H04L 9/0869; H04L 9/16; H04L 9/14; H04L 9/30; H04L 9/3006; H04L 9/08
See application file for complete search history.

(56) References Cited

U.S. PATENT DOCUMENTS

| | | |
|---|---|---|
| 10,505,722 B2 | 12/2019 | Anshel et al. |
| 10,952,069 B1 | 3/2021 | Mohamed et al. |
| 2006/0280296 A1 | 12/2006 | Vasyltsov et al. |
| 2007/0064933 A1 | 3/2007 | Bantwal |
| 2016/0087796 A1* | 3/2016 | Lucamarini ........... H04L 9/0869 380/46 |
| 2019/0386828 A1 | 12/2019 | Garcia Morchon et al. |
| 2020/0204365 A1* | 6/2020 | Brown ................ G06F 21/32 |
| 2021/0091928 A1* | 3/2021 | Dockser ............... H04L 9/0637 |

FOREIGN PATENT DOCUMENTS

CN    103971318 A    8/2014

* cited by examiner

*Primary Examiner* — Quazi Farooqui
(74) *Attorney, Agent, or Firm* — DENNEN IP LAW, LLC; Ann I. Dennen (57) ABSTRACT

A system has a server and a processor electrically coupled to the server that receives an input binary string as an input and uses a decision matrix to determine via a plurality of cycles what a next state of a plurality of target cells being transformed will become to produce an output binary string that will be a cryptographic key.

27 Claims, 8 Drawing Sheets

DIGITAL FORGE SYSTEMS AND METHODS

BACKGROUND

Cellular automata (CA) are discrete, abstract models of computational systems. They are also known as cellular spaces, tessellation automata, homogeneous structures, cellular structures, tessellation structures, and iterative arrays.

CA are often used to model complexity and represent non-linear dynamics. A typical CA model is a spatially distributed process. The model usually consists of an array of two-dimensional cells, which evolve over time according to the state of neighboring cells and rules mandated by a particular simulation. CA have become useful in scientific fields, including physics, theoretical biology, and microstructure modeling.

CA are spatially and temporally discrete and composed of a finite set of homogeneous units, e.g., cells. At each time unit, the cells instantiate one of a finite set of states, e.g., 0 or 1. They evolve in parallel at the discrete time steps, following state update functions or dynamic transition rules. That is, the update of a cell state is instantiated based on the states of its local neighborhood.

With all cryptocurrencies, ownership is tied to the private key. If another party acquires the private key, they can claim all assets signed with the private key. There is no legal framework that recognizes the ownership of private keys. This can make it hard to enforce ownership of cryptocurrency when there are no legally recognized methods that tie ownership to private keys. This is in contrast for all other physical assets whether it is stocks, houses, boats, planes, and the like. In these situations, Legal Titles confer ownership. Consider this scenario: Person A holds 50 million USD/EUR in Ether. If a malicious party acquires the private key through theft or hash collision, they will claim all the funds signed with the private key. For people who forget their private key or lose it, their funds are lost. They will never recover their funds.

DESCRIPTION OF THE DRAWINGS

The present disclosure can be better understood with reference to the following drawings. The elements in these drawings are not necessarily drawn to scale but are included to clearly illustrate the principles pertaining to this disclosure. Furthermore, like reference numerals designate corresponding parts throughout the views.

DETAILED DESCRIPTION

The present disclosure describes a process (i.e., a forge process) for use in cryptography. The forge process is a process configured for receiving a binary string (i.e., a hash) as an input, and passing the input through a formula that produces a result, which is another binary string. In one embodiment, the hashing of the input may be used for cryptography.

The forge process uses a decision matrix, which is an array (i.e., a digital forge set) of data, to process the incoming binary string into another binary string that is linked by two parameters, including: (1) the number of forge cycles; and (2) the digital forge set number. Note that the digital forge set may be n-dimensional and is a decision matrix that determines what the next state of a target cell will be.

The target cell is the cell being transformed, and the next state of the target cell is determined by its neighboring cells. The combination of the target cell and its neighboring cells is a substructure.

A successful digital forge set will exhibit a high level of entropy in the transformation process. Note that entropy is often roughly used as a measure in the unpredictability of a cryptographic key.

Assuming that the values of the cells are either a "1" or a "0," the digital forge set determines the value of the target cell's next state. A high level of entropy causes predicting an output from the forge cycle extremely difficult because all successive patterns generated from the forge cycle are unknown.

Digital forge sets may have diminished entropy where the result from a certain number of forge cycles produces all 0s, 1s, or the pattern generated will begin to repeat itself. If a pattern repeats or all 0s or 1s appear, there is no new information to convey. Thus, it has a low entropy. These digital forge sets are not valid and are discarded.

A successful digital forge set produces entropy. The process of finding such a digital forge set is known as "mining." Mining, the search for valid digital forge sets, drives growth in a digital forge ecosystem.

A Digital Forge Set is a decision matrix that determines what the next state of the target cell will become. A cell is a space occupied by a binary digit. The target cell is the binary digit that is being transformed. The next state of the target cell is dependent upon the surrounding cells. The combination of the target cell with its neighbors is called a substructure. The substructure is a smaller version of the surface chosen for the forge process. For instance, if the surface is a bitCube, the substructure will be a unit bitCube. The substructure will be composed of 27 bits. This arrangement will have one target cell with 26 neighbors. The twenty seven deciding cells would yield 134,217,728 ($2^{27}$) different states. Each state is represented by a 0 or 1, which will be the next value of the target cell. This is all the possible forge sets for a bitCube. It is represented mathematically as $2^{512}$.

The digital forge process relies on creating an n-dimensional surface transform and a Digital Forge Set, represented as $DFS_i$. A forge set is a substructure of the surface transform. There are two parameters that determine what type of surface transformation is use: the number of bits in the data and the desired complexity. The greater the complexity, the greater the entropy. This holds true for higher dimensional surfaces. As an example, consider an array of data that is 512 bits. The type of surface transform must accommodate all the bits. This array of bits would be transformed into an 8×8×8 bitCube (an 8 bitCube). This would be represented in memory as 8 "two dimensional arrays that are comprised of the 8 arrays with 8 bits in each. The substructure is comprised of the decision group which would be a bitCube comprised of 27 bits, with the target cell in the center. The target cell could be any cell position, but in this instance, it is the center cell.

Figure 1:
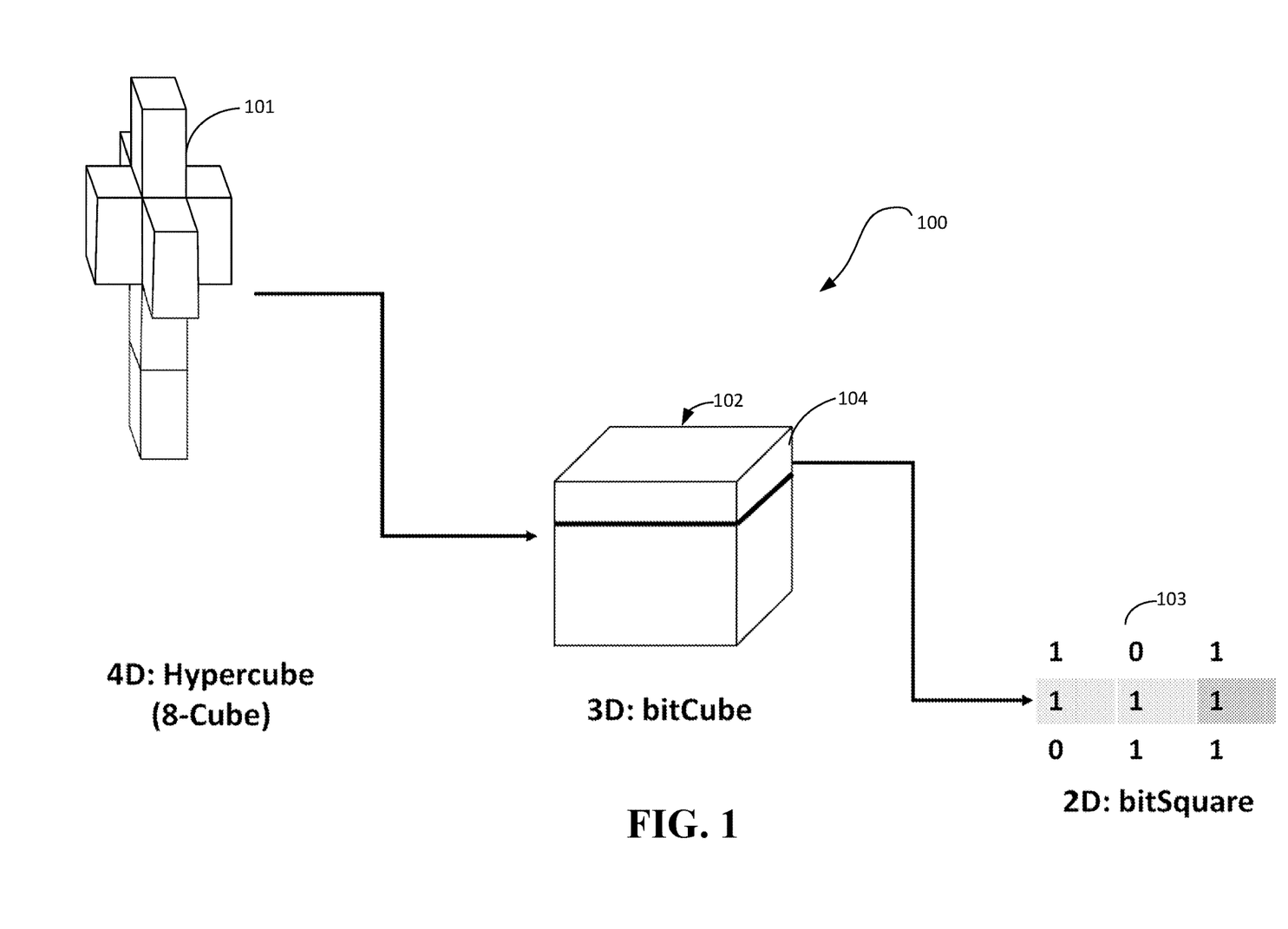
FIG. 1 is a drawing of a digital forge process in accordance with an embodiment of the present disclosure.

FIG. 1 is a diagram depicting an aspect 100 of the digital forge process in accordance with an embodiment of the present disclosure. In this regard, a transform in accordance with an embodiment of the present disclosure is shown. That is, a hypercube 101, which comprises eight cubes is four dimensional. Each of the eight cubes of the hypercube 101 is transformed into a three-dimensional bit cube 102. The bitCube is composed of at least one, usually three, two-dimensional arrays 104 comprising bits illustrated by the table 103. The two-dimensional bitSquare 103 shows the way by which the values of the bits are transformed on the three-dimensional bitCube.

Figure 2A:
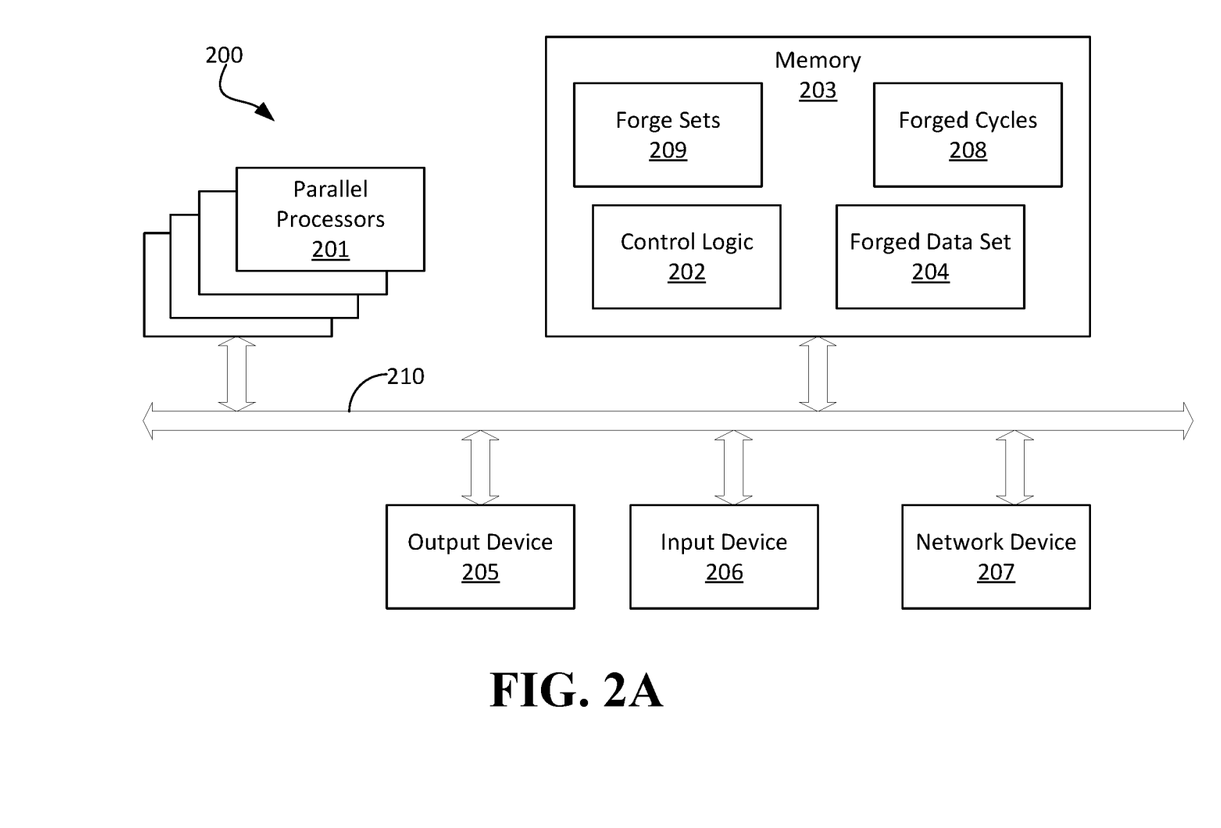
FIG. 2A is a block diagram of a digital forge system in accordance with an embodiment of the present disclosure.

FIG. 2A is a block diagram of a system 200 for use in cryptography in generating a key using a digital forge algorithm that uses a digital forge set to process a binary string in accordance with an embodiment of the present disclosure. The process evolves an input binary string into another binary string that is linked to the input binary string by the number of forge cycles and a digital forge set. The system 200 comprises a plurality of parallel processors 201 and memory 203.

Stored in memory 203 is control logic 202. The control logic 202 is for controlling the system 200. The control logic 202 may be software, hardware, firmware, or a combination thereof.

The exemplary embodiment of the system 200 depicted by FIG. 2 comprises one or more parallel processors 201, such as a digital signal processor (DSP) or a central processing unit (CPU), that communicates to and drives the other elements within the system 200 via a local interface 210, which can include at least one bus. Further, the one or more parallel processors 201 is configured to execute instructions of software, such as the control logic 202.

Further stored in memory 203 is a plurality of digital forge sets 209. A digital forge set is a digital map that identifies values of target cells to which the values of the target cells change. Also stored in memory 203 is data indicative of the number of forge cycles 208 and the forged data set 204. In this regard, the control logic 202 executes, creates a forged data set 204, and stores the forged cycles 208. The forged data set may then be used as a cryptography key.

Further, the system 200 comprises an output device 205, which can be any type of device for outputting data to a user. An output device 205 may be a display device, light emitting diode (LED) display device, and the like.

The system 200 comprises an input device 206. The input device 206 is for any type of device for inputting data into the system 200. The input device 206 may be a mouse, touchscreen, microphone, a keyboard, or the like.

In addition, the system 200 comprises a network device 207 for sending and receiving data to and/or from a management server device. The network device 207 is any type of device that allows the system 200 to communicate on a network.

Once the transaction data is verified, it is broadcasted on a different protocol to the Blockchain clusters 205-208. The Blockchain clusters "mine" the transactional data identification (id) into blocks and verifies that a block has been mined. Once a block has been mined and verified, it is broadcasts to the Ledger Clusters 209 on another protocol. This maintains an open ledger system, so people have access to their money. Further, it keeps a historical record of the transactions.

Figure 2B:
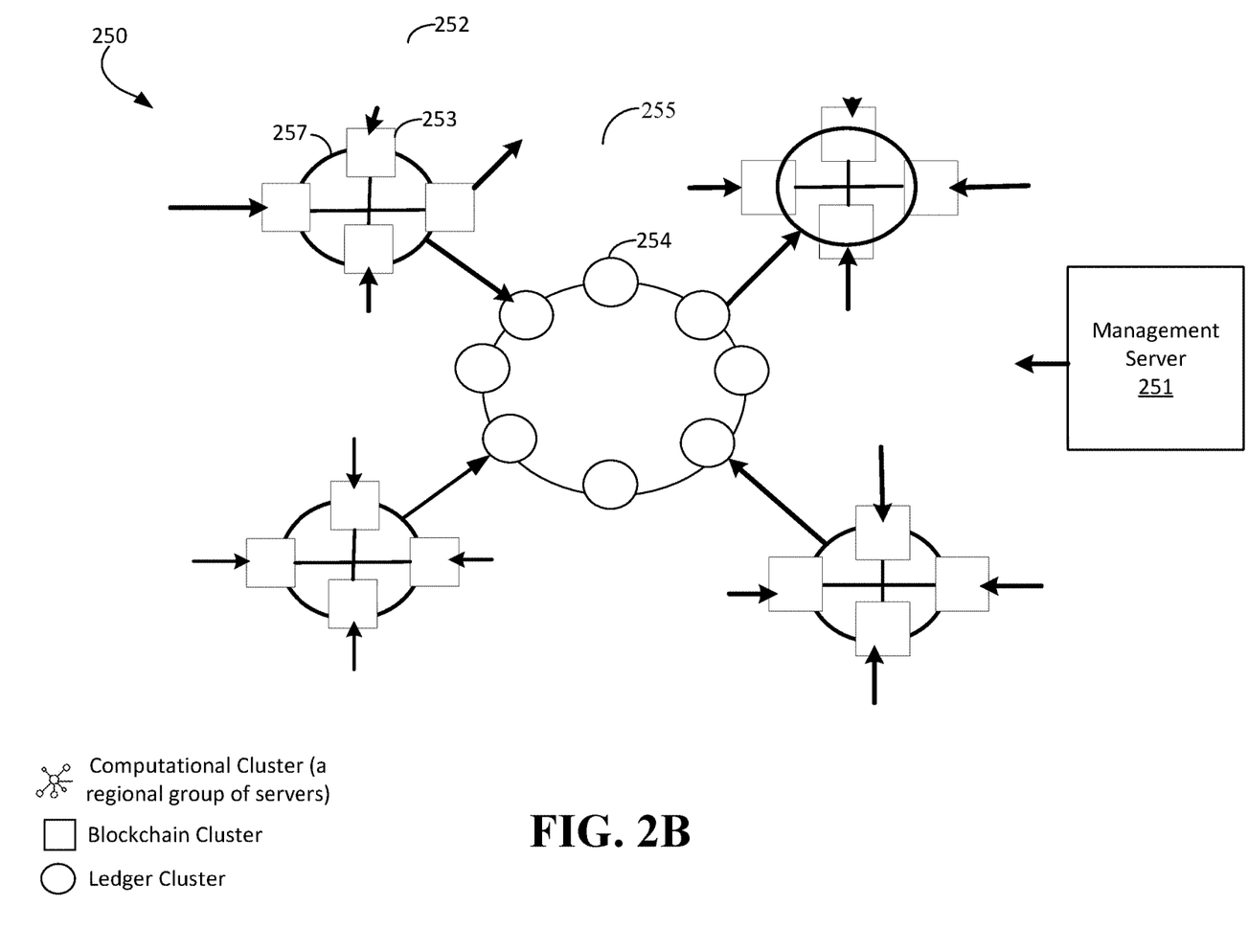
FIG. 2B is a diagram of a digital forge ecosystem in accordance with an embodiment of the present disclosure.

FIG. 2B is a diagram of a digital forge ecosystem 250 in accordance with an embodiment of the present disclosure. The digital forge ecosystem 250 comprises computational clusters 252, blockchain clusters 253, and ledger clusters 254.

The computational clusters 252 may be a plurality of servers working in parallel to perform calculations for the digital forge process. In this regard, work together so that they can be viewed as a single system. Each server in the computational cluster 252 is a separate node configured to perform the same task and controlled and scheduled by software (not shown). The components of the computational cluster 252 may be connected to each other through fast local area networks (LAN), with each server running its own instance of an operating system. In most circumstances, the servers use the same hardware and the same operating system, although different setups, different operating systems or different hardware can be used on each computer. The computational cluster 252 is deployed to improve performance and availability over that of a single computer, while typically being much more cost-effective than single computers of comparable speed or availability. The computational clusters 252 computes the "Mynts" and verifies the authenticity of the Mynt. A Mynt is the base unit of any metal entering the ecosystem. This will be discussed later.

The blockchain clusters 253 are coupled together by a network 257. The blockchain clusters 253 deanonymizing blockchain data. The blockchain clusters 253 link together wallets that belong to the same user or entity. Once the computational clusters 252 verify a Mynt, it is broadcasted on a different protocol to the Blockchain clusters 253. The Blockchain clusters 253 "mine" the mynt id into blocks and verify that a block has been mined.

The ledger clusters 254 are a series (or chain) of blocks on which transaction details are recorded after suitable authentication and verification by the designated computational cluster 252 and the blockchain lusters 253. Once a block has been mined and verified, the blockchain clusters 253 broadcast on another protocol to the ledger clusters 254. This maintains an open ledger system so that users have access to their assets, and the ledger clusters 254 keep a historical record of each transaction.

Figure 3:
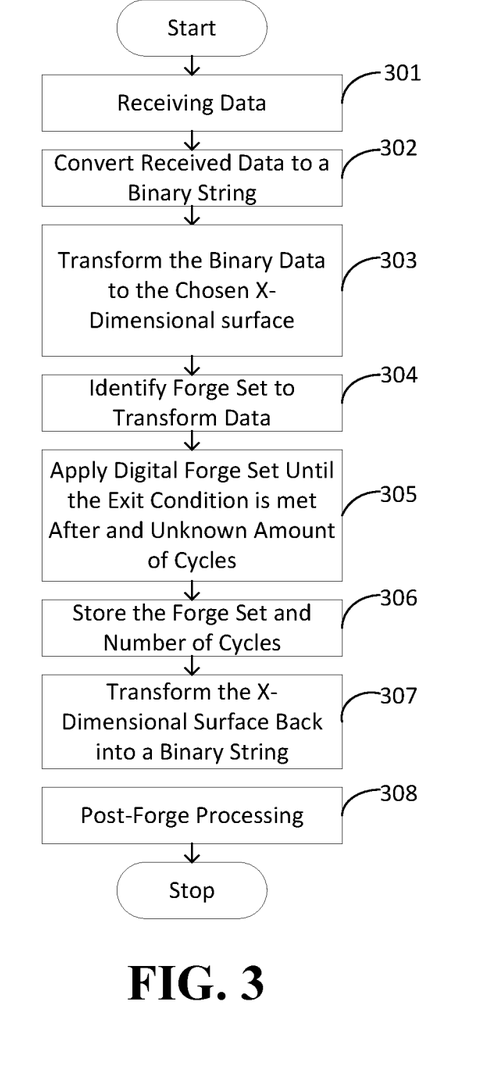
FIG. 3 is a flowchart of exemplary architecture and functionality of a digital forge process in accordance with an embodiment of the present disclosure.

FIG. 3 is a flowchart depicting exemplary architecture and functionality of the system 200 (FIG. 2). An exemplary digital forge process is indicated in the flowchart of FIG. 3.

In step 301, the system 200 receives data. In one embodiment, the system 200 receives data from a management server. In another embodiment, the system 200 includes a random number generator for generating the initial data.

In the next step, the control logic 202 converts the received data to a binary string in step 302. Note that the fundamental part of any digital financial transaction is data. Most cryptocurrency transactions include data that are packaged into an object. This data is then "signed" with the private key and transmitted to the blockchain for validation before it is included within a transaction block. All processing of data by the computer involves converting it into a binary string.

In step 303, the control logic 202 transforms the binary data into a user-defined x-dimensional surface. An example is shown in FIG. 1 and is a hypercube. The type of surface transform corresponds to the desired complexity of the Digital Forge Process executed by the control logic 202. The more complex the surface is, the greater the computational resources that must be devoted to the forge process. The surface enables control of the number of neighbors that surround the target cell through the substructure. The greater number of neighbors that surround the target cell correspond to an exponential increase in the difficulty of predicting the next state of the target cell. This is achieved by increasing the number of states that would determine the next state of the target cell. The digital forge process is unique in that it transforms all binary data streams into an X-Dimensional cube, where X is 2, 3, 4, 5 . . . etc. The number of bits in a binary string must be less than or equal to the maximum cube units. This is given by $x^3$, where x is any integer. Most digital signatures and public wallet addresses are 512 bits or less. This would set X to 8 ($8^3$=512). Should the number of bits be greater than 512, the next larger integer could be chosen that covers the range. If the number of bits is not exactly 512, "padding" with 0s can be used to the fill up the binary string.

Basic exponential math holds the key to creating the bitCube: $8^3=(8^2)*8^1$. The relationship allows a three-dimensional array to be created that is perfectly 8×8×8, the perfect bit cube. A bit cube is three-dimensional surface that can hold a specific number of bits that is determined by the previously stated cubic relationship. In computer memory, the bit cube is a stacked two-dimensional array. The exponential relationship also holds for all other expansions with greater dimensional cubes, i.e., Hypercube and the Penteract. The Hypercube would be formed by multiple (8) bit-cubes $(8^3)*8^1$ construction. In computer memory, they would be stacked bit cubes. In this example 8 is used for consistency with the stated data length of 512 bits. In practice, the size of the surface could be any size to accommodate the data. The Penteract would be formed by stacking 8 hypercubes $(8^4)*8^1$. An increase in the dimension of the surface transforms involves the stacking of lowered dimensional surfaces; in most cases, corresponding to the cubic integer.

In step 304, the control logic 202 identifies the appropriate forge set to transform the data on the x-dimensional surface. The digital forge set number determines how the cells change after one cycle has elapsed. The process of encoding involves successive cycles. This could involve millions, billions, or even trillions of cycles; the forge cycle process will be discussed in depth later in the paper. The Forge Process utilizes the Digital Forge Set to transform the data.

The number of Digital Forge Sets is given by:

$$2^{2^{(x^y)}},$$

where x is the number of cells that determine the state of the target cell in the next cycle, and y in the Surface Dimensional Number. This is where the BitCube comes from. All surfaces are derived from a N-dimensional cube, whether a cross section of a cube (2-D), a traditional cube (3-D), Hyper BitCube (4-D), Penteract (5-D), etc. The higher the dimension the greater the entropy within the encoding process. The base case for the Forge Set is one target cell set with two neighbors. This equates to a three-cell decision grouping. All Binary Forge Sets are based on this.

The base case is given by the three cells [0 0 0], where each digit corresponds to one cell. This is a 1-Dimensional surface. The number of forge processes is given by:

$$2^{2^{(3^1)}}) = 2^8 = 256.$$

There are a total of the 256 forge processes available. Not every forge number is valid. They become a unity (0 or 1) value after an indeterminate number of successive forge cycles. The number of cycles it takes to determine whether a forge set is valid or not is dependent upon the initial input and the forge set number chosen. It is up to the architect to determine which forge set works and which one to use for the digital forge processing. A successful Digital Forge Set will generate entropy. Here is a how Digital Forge Set Number is represented: The target cell, for this application, is always the center digit of the decision group. In application, it would be any cell. The state of the neighboring cells will determine the state of the target cell in the next cycle. For example, the Digital Forge Set Number 175 (Base 10) is: 10101111. As the dimension increases, so do the number of forge sets. How a sample digital forge set number is derived is listed below. It codifies the decision group and how it transforms the data.

[0 0 0]→1
[1 0 0]→0
[1 1 0]→1
[1 1 1]→0
[1 0 1]→1
[0 1 1]→1
[0 1 0]→1
[0 0 1]→1

Using the Digital Forge Set Number of 175 (Base 10), if the target cell is 0, and its neighbors are both 0, then the target cell will become 1 in the next cycle. Stated again, the Forge Set determines what the target cells next value will be, and that is determined by its present value, along with the neighbors' values-collectively referred to as the Decision Group.

Dimensions and Possible Forge Sets
    Bit_Square (2-Dimensional Cube)=$2^{512}$
    Bit_Cube (3-Dimensional Cube)=$2^{134217728}$
    Hyper_Bit_Cube (4-Dimensional Cube)=$2^{2.417851639\times10^{24}}$
    Bit_Penteract (5-Dimensional Cube)=$2^{1.413477652\times10^{73}}$ A bitCube is used for demonstration purposes. With the bitCube, the decision group would be composed of 27 cells. These 27 cells would determine the next state of the target cell. With 27 cells in a decision group, there would be 134217728 different digital forge set numbers available. Each of those sets would consist of the rules that determine the next state of the target cell by evaluating the value that it and its neighbors would represent. For a Hyper_Bit_Cube, "the number of cubes"*27 cells would equal the decision group that would determine the next state of the target cell. As the dimensional surface and the corresponding digital forge set increases, so does the entropy, along with the complexity. Security is built upon entropy.

Not all digital forge sets produce entropy to yield random patterns that make predicting future permutation impossible. It would be at the organization's discretion as to which digital forge set is utilized. The greater the computing power that an organization possesses, the greater the number of successful (increasing entropy) digital forges would be discovered. A digital forge set would have an intrinsic value on its own. The digital forge set would also be used when authenticating a digital asset or digital metal.

In step 305, the control logic 202 applies a digital forge set to the converted binary string until an exit condition is met and after an unknown number of cycles. The BitCube is processed through the digital forge set until an exit condition is met. The exit condition is based on adjustable difficulty. Adjustable difficulty is a common concept to current cryptocurrencies. Adjustable difficulty is achieved by specifying the number of digits are generated to match a stated pattern before it can be "mined." For Bitcoin to be "mined," the miner must find a hash that starts with 19 "0s".

The digital forge process also relies on adjustable difficulty. The higher the difficulty the more effort it takes to generate the exact pattern. This eliminates the chance of the randomly generating the number sequence. This number is also tied to a specific digital forge set number. The digital forge set number also acts as an authentication process.

In step 306, the control logic 202 stores the digital forge set number and the number of cycles (epoch) it took to arrive at the exit condition. In this regard, once the exit condition has been met, the number of cycles it took to forge the asset is stored, along with the digital forge set used. These two values are vital to authenticating the validity of the asset.

Figure 6:
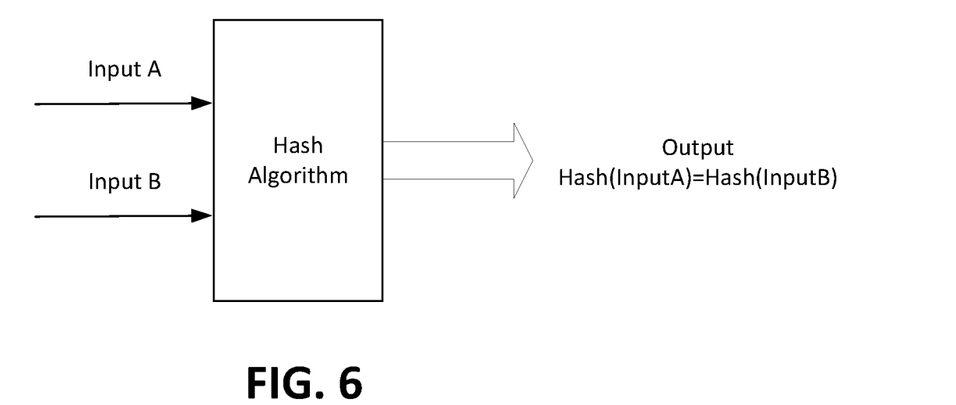
FIG. 6 is a block diagram of a hash algorithm with two inputs.

The control logic 202 authenticates the process in evaluating the transaction data at a certain epoch (an epoch is the numerical permutation cycle). The transaction data at a certain epoch is called the fingerprint. Using the forge fingerprint in combination with the epoch and digital forge set allows for a procedural way to track the authenticity of transaction data. This is illustrated in FIG. 6. Here, verification starts at the genesis block A. The formula is applied $(DFS_i: E)_{A \rightarrow B}$. Each output becoming the input to B until the current ID is discovered.

This technique is an authentication process. An application of this technology is in the creation of "Proxy Private Keys." The current cryptocurrency ecosystem is built upon private keys and public addresses. Public addresses are derived from the private keys via various cryptographic algorithms. The most common being the "Elliptic Curve Cryptography" algorithm. The loss of the private key results in the loss of funds that are tied to the public address. This is a massive problem for the industry. The Digital Forge System solves this problem by generating "Proxy Private Keys." A proxy private key is generated by taking a random hex string that is the same length as the private key and running it through the Digital Forge System until the real Private Key is generated. The Proxy Private Key is a fingerprint that preceded the actual Private Key at a random epoch. The process for generating the Proxy Private Key is the same as previously discussed. A dimensional surface structure is chosen that will accommodate the number of bits in the Private Key. Multiple Forge Set Numbers are run in parallel. This process is executed on a High Performance Computer (HPC) that has the capability for parallel processing. The Digital Forge Set Number that generates the actual private key in the least number of epochs is the successful Forge Set Number. The "Proxy Private Key" is comprised of four parameters: the initial random input string, the digital forge set number, the epoch number, and the actual private key. The "Proxy Private Key" is simply a random fingerprint from the Forge Process. The fingerprint is the predecessor to the actual private key. The Proxy Private Key is verified by running it through the Digital Forge Process with the same forge set number for the specified number of epochs that is the difference between the Number of Epochs it took to generate the actual Private Key and the number epochs of the Proxy Private Key "Fingerprint." This number is given by: Total number of epochs-fingerprint epoch. For instance, if the total number of epochs is 100 and the fingerprint epoch was 91, the Digital Forge Process would run for 9 cycles with the Proxy Private Key as the input to the Forge System.

After 9 cycles, the real Private Key will have been produced algorithmically. The authentication process is when the generated Private Key is used to sign cryptocurrency transactions. If it is the correct Private Key, then the network will accept the transaction. If not, it will reject it. The private key is never revealed it is only used to sign transactions after being generated algorithmically, and then overwritten in memory. The Proxy Private Key could be stored on an open ledger system, written down, or stored in whatever is best for the holder of it. If a malicious actor gets the private key, there is nothing he can do with it because he does not have all the parameters that transforms it into the actual Private Key. The authentication process is whether the actual private key is generated as the output from the Digital Forge Algorithm.

In step 307, the control logic 202 transforms the x-dimensional surface back into a binary string once the exit condition is met. In this regard, once the digital forge set and the Epoch arrive at the exit conditions, the control logic 202 stores the digital forge set and the Epoch. The control logic 202 deconstructs the X-Dimensional Surface back into a binary string. These bits are now "forged," and they represent the new ID for the object(s).

In step 308, the control logic 202 may perform post-forge processing on the binary string. Note that binary is the basic method that information is stored and processed in a computer. To transmit for consumption by other applications or human users, the binary string may be converted to a Hexadecimal string. In one embodiment, it is up to the system architecture to determine whether any other post processing need to occur on the binary string. This can occur through further hashing or encryption.

Figure 4:
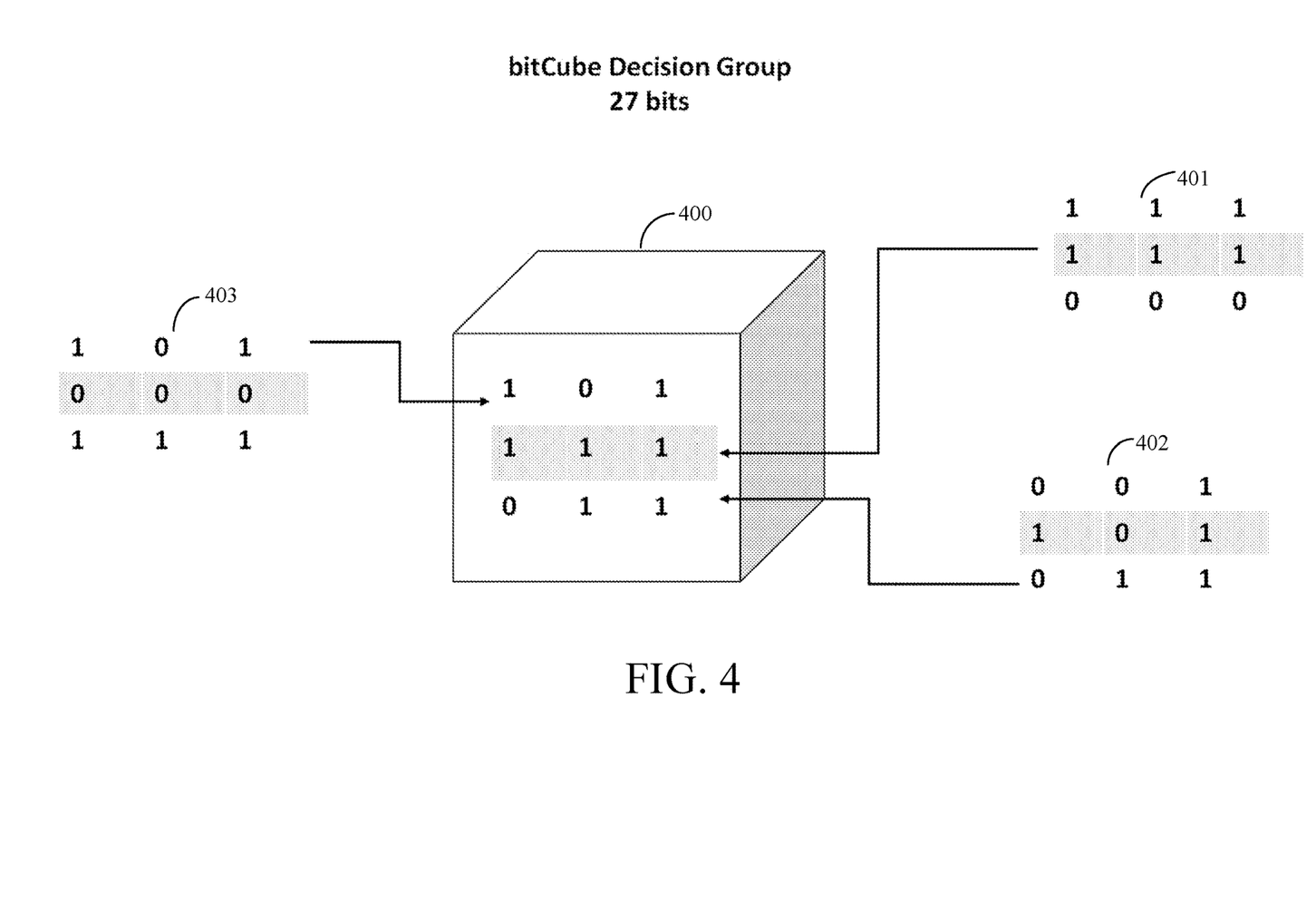
FIG. 4 is a bitCube decision group that may be used in the digital forge process of FIG. 3.

FIG. 4 is a bitCube decision group 400 that consist of 27 bits, which includes nine bits for each of three layers of the cube. In this regard, from table 403 the bitCube 400 has an end bit string of "1 0 1." The bitCube 400 comprises a middle bit string of "1 1 1" from table 401, and the bitCube 400 comprises a bottom bit string of "0 1 1." Each of the tables 401-403 identifies what numbers are in each layer.

Figure 5:
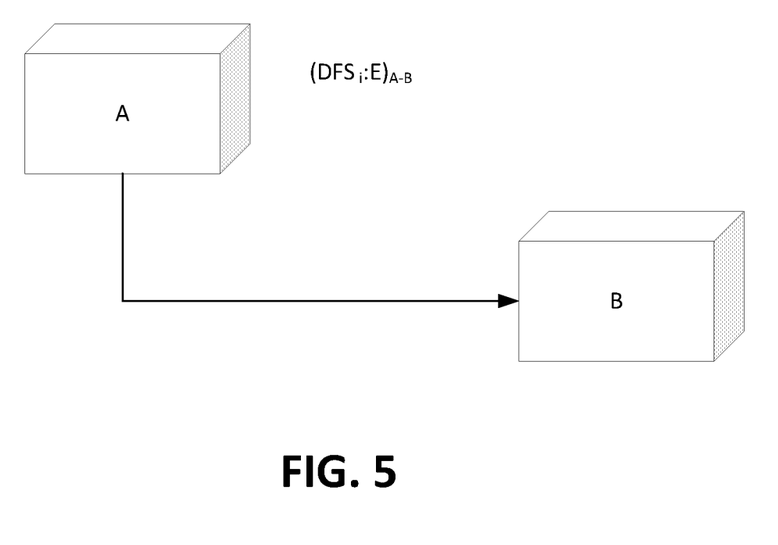
FIG. 5 is a block diagram illustrating an authentication process of the present disclosure.

With reference to FIG. 5, the authentication technique is described. Verification begins at a genesis block, e.g., Block A. Each output is the input to the digital forge process until the current identification is arrived at, which is Block B. The formula applied to each output from Block A is $(DFS_i: E)_{A \rightarrow B}$.

As illustrated in FIG. 6, hash collisions occur when two different inputs produce the same output (Hash). This may cause issues with the system 200 (FIG. 2). The digital forge system 200 of the present disclosure makes the hash collision vulnerability obsolete. There are two other arbitrary parameters, in a large probability space, that must be known before the output can be generated. It would be statistically unlikely to produce one of the parameters by chance. To randomly produce both parameters, would be orders of magnitude even more unlikely.

If the official "Proxy Private Key" is lost by the holder, The system 200 may regenerate it for the owner by entering the correct unique data identifier to biometric data described above. This prevents countless amount of cryptocurrency from being lost due to the owner simply forgetting or misplacing the private key.

Digital Metal

The digital forge system 200 of the present disclosure allows precious metals to be digitized and traded on an open ledger system. The most common criticism of cryptocurrencies is that they are not backed by anything. An issue that prevents precious metals from being used as a medium of exchange is how to deal with change. For instance, if one pays for a product that costs 42 grams of gold with 100 grams of gold, how would 58 grams be returned to the payer? To pay for products with precious metals requires exact coinage. The digital forge system 200 simultaneously solves these two problems—Digitizing physical assets and Making Change.

The first step to digitizing a physical asset it to determine the data to describe it, the base amount, and to choose a surface for the forging process. The base amount is the greatest quantity to be digitized. It is called a Mynt. A Mynt is the standard unit of maximum weight of the metal to be digitized. The surface is chosen according to the desired degree of complexity in the permutations (entropy) that will forge the asset's digital identifier until an exit condition has been met. When using a bitCube of size 8, the Mynt identifier will be 512 bits or 128 hexadecimal digits. For initial applications, the standard weight must be determined. For this example, a 100-gram bar of gold is used for exemplary purposes. The gold bar is exchanged for a digital receipt. This digital receipt represents the initial amount of gold deposited. It is comprised of 128 hexadecimal digits. This could be a hash of the initial owner, date, bank ledger number, etc. It is up to the system architect to determine the identification system for each bar that comes into the bank. The digital forge process takes the physical gold and transforms it into a digital presence. The digital presence is representative of the initial amount deposited. This has a presence on the block chain.

The firm that receives the deposit then utilizes the digital forge system 200 to generate the mynt identification string. The initial transformation is the number sequence that produces the Brokkr and Eitri Magic Number. For this example, it will be "8989". In practice it would be any number sequence that the system architects agree on. The mynt sequence is of the following structure: [bullionID]:[B&EMN]:[VersionID]. The bullionID is proportional to the weight. The initial block had 100 grams, so it would be 100 digits long. This will become especially important when discussing splitting and combining coins. This is necessary to accomplish if they are going to be used in a transactional economy application.

The VersionID is used to identify the specific instance of the mynt. A mynt can be processed by three main functions: "Re-forge", "Fusion", "Fission." Re-forging is when the mynt changes accounts, but the physical amount remains the same. Fission is where the mynt is broken in the two smaller components. Fusion is where two smaller components are combined into a larger unit. A more detailed explanation on this process will follow. The Digital Forge System (DFS) process is very energy intensive. This is what helps secure the process. The initial hash is run through the DFS process and generates a unique mynt id. For this instance, it is
0xdd9d2a17852bd0044c9e8e0599138bab1e0319b21097
b4e9e1686b58e26ac73aa
3a47b750cad99a71a2c83a9d5fc6bbf44988989d636c4
8a7631edc5f37dbfb1

The number of evolutions (epoch) to achieve this and the digital forge set are stored. They authenticate the transaction. These key components of the process will not be stored on the open ledger block chain, but a secure server. This ID would be deposited into the clients wallet on the block chain. It is now spendable. The versionID is different, and it will represent new ownership.

Fission

Figure 7:
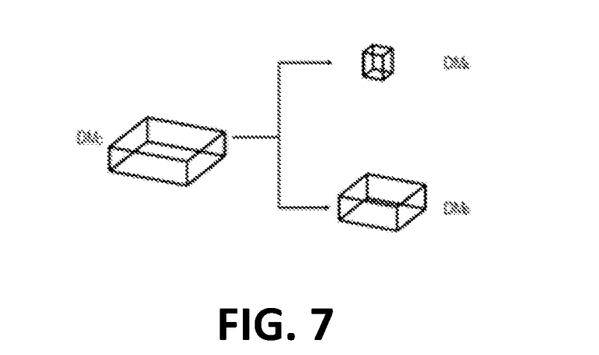
FIG. 7 is a block diagram of the splitting coins into two smaller weight coins.

Fission is where a mynt is split into two smaller weight coins as is illustrated in FIG. 7 to accommodate spending. When a Bitcoin transaction occurs, there are two transactions. One where the purchase price goes to the wallet of the seller (receiver). The remaining amount is returned to the buyer (sender) through another transaction. A similar process occurs here. The mynt is split into two coins. One coin will be for the amount to pay the seller, and the other coin will be what is left over, which will return to the buyer's wallet.

Fusion

Figure 8:
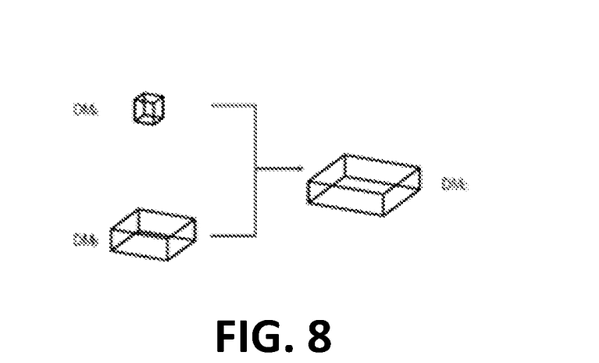
FIG. 8 is a block diagram of two smaller coins being combined into a larger coin.

Fusion, as illustrated in FIG. 8, is the process where two smaller coins are combined into a larger coin that is equal to the sum of their mass. Without Fusion, after a considerable amount of time has transpired, all coins would devolve to the lowest set mass possible. Everyone would have small change in their wallets. When two coins are combined into the equal weight of a mynt, it is called a recombined mynt (rMynt).

For scenarios where the sum of two coins is greater than a mynt, the remainder is forged into a coin, in a modulus fashion. For instance, there are two coins that are fused each with a weight of 75 grams. The combined weight is 150 grams. The set mynt weight is 100 grams. This is the maximum allowed weight in the ecosystem. The output from the fusion process is one rMynt with 100 grams and a coin with weight of 50 grams. This process prevents inflation from occurring with this monetary system. There can never be more coins are mynts in circulation than there is gold deposited. If the monetary base must be increased, there are two possibilities.

1) Bring more metals into the ecosystem; and
2) Increase the weight that is a "Standard Mynt.

In the present example, 100 grams are used. In practice, it could be 1 kg or 1 metric ton. The number is limited by the amount of metal there is on the earth, and then how much of the metal is brought online in the ecosystem.

Building the Infrastructure

In one embodiment, linked computers enable a cryptocurrency infrastructure. The ecosystem that cryptocurrencies reside in rely on solving computationally complicated problems. The more advanced the problem to solve, the more aggregate computing cycles that must be devoted to solving the problem. The harder the problem to solve in the ecosystem, the more secure the ecosystem. Cycles require energy which have a cost. The participants in the ecosystem providing the computing power to solve the complicated problems are colloquially referred to as miners. They are rewarded through a Proof of Work (PoW) or Proof of Stake (PoS) system. The reward takes the form of newly minted coins (Bitcoin method) or fees that are collected from computed transactions called gas (Ethereum method).

The computers that make up the digital forge Ecosystem are called Foundries. Foundries perform the function of determining what rule set has entropy. Entropy is necessary to successfully forge the data sets. Lack of entropy allows future data sets to be predicted, so entropy is vital to a successful cryptocurrency system.

When forging occurs, the foundry can withhold a fee. This is what incentivizes participation within the digital forge ecosystem. Because the fees are not constant and in a competitive environment, it encourages participants to bring the most computing power for the lowest unit of cost. The competition among foundries is based on which one can offer the lowest fees. The one with the lowest fees will get the most traffic directed to it. Fees in the ecosystem is referred to as FIRE (Foundry Input Recast Energy). As FIRE is necessary for traditional foundries to operate, fees collected from processed FIRE allow the owner of the computing resource to the fund the computers operations and power consumption.

FIRE is not the sole determining factor in determining how traffic gets routed to a foundry. Another is the entropy {incentive to find and use less known digital forge sets} of the Forge sets. Undiscovered forge sets could yield a result in fewer epochs, so it is in the foundries' interest to try lesser used or unknown forge sets. The forge sets of the more explored domains will have a lower value because they will be the most used across the ecosystem and will generate the same results. Using the same Forge Sets across the ecosystem brings no new information into the ecosystem. It is just a race to arrive at the exit condition. If this were the only the case, only the participants with the greatest computing resources would dominate. Discovering newer Forge Sets would help to maintain healthy competition and ensure that a "Mining Monopoly" does not exist. The participant who discovers new forge sets will be able to demand a higher price for using their forge set because it is not widely known and solves the problem in a fewer number of epochs. This will encourage participants to bring greater computing online within the ecosystem. The greater the computing power, the more forge sets that can be discovered in the lesser explored realm Forge Number Space.

The higher and less known digital forge sets offer greater entropy. Therefore, using these digital forge sets justifies charging a higher fee for their use. This in turn provides an incentive to provide an ever-growing amount of computing resources to the digital forge system 200.

An argument against the adoption of cryptocurrency is that they are backed by nothing. The present digital forge system 200 enables the digitation of physical assets and the active trading on whatever blockchain utilizes the digital forge process. The block chain may be backed up on secure servers, and if there are any events that interfere with the operation of the block chain, assets may be returned to the depositors.

Currently, if anything interfered with the block chains, all the value of the tokens and coins would cease to exist. This would constitute one of the largest deflationary events in human history, and trillions of dollars would just cease to exist in a fraction of second. The immediate utilization of the present digital forge system provides secure and recoverable signatures for cryptocurrency transactions.

Scientists and engineers have authored papers that state cryptocurrencies will be obsolete due to the advances made in the field of quantum computing. The computational might of quantum computers would be able to crack the hashes that all the current cryptocurrencies are built on. The present digital forge system 200 would evolve in lock step with quantum computing. The digital forge system 200 would be the primary method that is used to create cryptocurrencies within a quantum computing infrastructure.

The increase in computing power allows for the digital forge system 200 to use more complex encoding sets and higher dimensional surfaces. Quantum computing would make any asset secured by the digital forge system 200 more secured as the number of computing cycles increases. It would embrace quantum computing and lay the foundation for a secure and fair economic system that is backed by real wealth.

Figure 9:
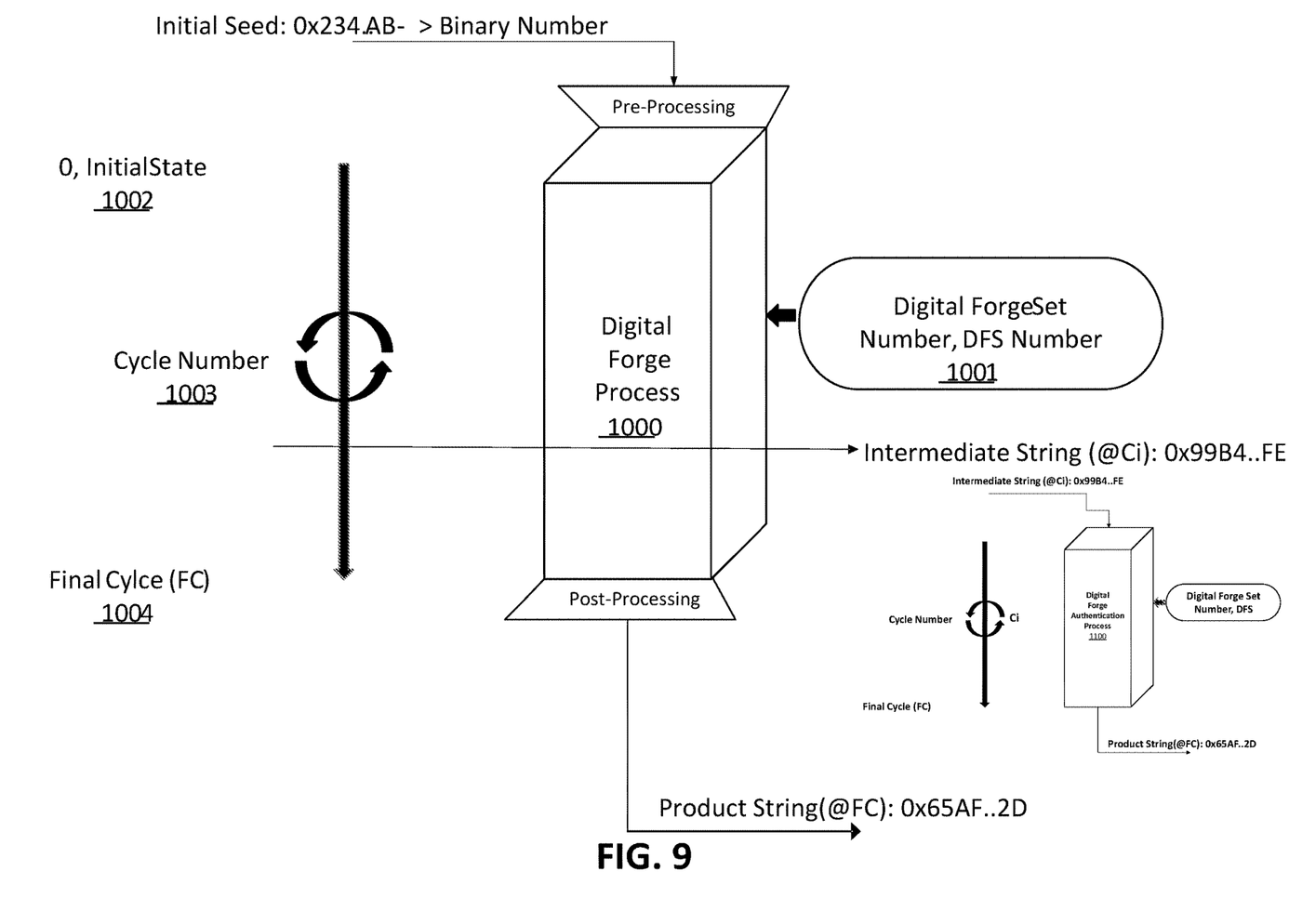
FIG. 9 is a block diagram of the digital forge process as shown in FIG. 1.

FIG. 9 is a diagram that illustrates the digital forge process described herein. Input to a digital forge process 1000 is an initial seed represented by a hexadecimal that is converted to a binary number for input to the digital forge process 1000. This hexadecimal number may be provided by a management server (not shown), or it may be generated by a random number generator. The binary input is pre-processed.

The digital forge process 1000 receives data indicative of a digital forge set (DFS) number. The DFS number identifies a matrix that determines what the next state of a target cell will become. A cell is a space occupied by a binary digit. The target cell is the binary digit that is being transformed. Note that the binary number input is transformed into an X-Dimensional Surface Transform and the DFS matrix determines the values of the next binary digit in each target cell.

This processes for x-cycles and until an exit condition is met. In this regard, the initial state 1002 is 0. The digital forge process 1000, using the matrix identified by the DFS number 1001 transforms the x-dimensional surface through the cycles 1003 until the final cycle 1004. The digital forge process 1000 transforms the x-dimensional surface to a product string, which is a hexadecimal number. The digital forge process 1000 performs post-processing on the produced string. The resulting string is a cryptography key.

In one embodiment, the digital forge process 1000 produces the intermediate string (fingerprint), which is a hexadecimal number. The intermediate string produced is a predecessor to the product string. The intermediate string may be used to evaluate whether the product string generated is valid. For example, if the digital forge authentication process 1100 chooses the string generated at cycle nine hundred thousand, the digital forge authentication process 1100 can make the intermediate string the input to the digital forge authentication process 1100 and set the number of cycles $C_i$ equal to 100 thousand (1 million–900 thousand). The product string should still be the result, if not, the intermediate string is not a valid input.

What I claim is:

1. A system, comprising:
   a server;
   a processor electrically coupled to the server configured for receiving an input binary string as an input, the processor further configured for using a decision matrix to determine via a plurality of cycles what a next state of a plurality of target cells being transformed will become to produce an output binary string that will be a cryptographic key.

2. The system of claim 1, wherein the output binary string is linked to the input binary string by the decision matrix and the plurality of cycles.

3. The system of claim 1, wherein the next state of the plurality of target cells is dependent upon a plurality of surrounding cells.

4. The system of claim 1, wherein a substructure includes the target cells and their surrounding neighbor cells.

5. The system of claim 1, wherein a surface for performing the transformation is a bitCube, and the substructure is a unit bitCube.

6. The system of claim 1, wherein a surface for performing the transformation is a bitSquare.

7. The system of claim 1, wherein a surface for performing the transformation is a hyper bit cube.

8. The system of claim 1, where a surface for performing the transformation is a bit penteract.

9. The system of claim 1, wherein input binary string is converted from a hexadecimal number.

10. The system of claim 1, wherein the binary string is transformed to a chose x-dimensional surface.

11. The system of claim 1, wherein the processor is configured to select a decision matrix to transform the input binary string.

12. The system of claim 1, wherein the processor is configured to transform the input binary string until an exit condition is met after an unknown plurality of cycles executed during transformation.

13. The system of claim 1, wherein the processor is configured to store the decision matrix and the plurality of cycles executed during transformation.

14. The system of claim 1, wherein the processor is further configured to transform an x-dimensional surface back into a binary string.

15. A method, comprising:
generating an input string by a server;
electrically coupling a processor to the server, receiving an input binary string as an input from the server, using a decision matrix to determine via a plurality of cycles what a next state of a plurality of target cells being transformed will become to produce an output binary string that is a cryptographic key.

16. The method of claim 15, further comprising linking the output binary string to the input binary string by the decision matrix number and the plurality of cycles.

17. The method of claim 15, further comprising determining a next state of the plurality of target cells, which is dependent upon a plurality of surrounding cells.

18. The method of claim 15, further comprising identifying a substructure that includes the target cells and their surrounding neighbor cells.

19. The method of claim 15, further comprising performing transformation using a bitCube, and the substructure is a unit bitCube.

20. The method of claim 15, further comprising performing transformation using a bitSquare.

21. The method of claim 15, further comprising performing transformation using a hyper bit cube.

22. The method of claim 15, further comprising performing transformation using a penteract.

23. The method of claim 15, further comprising converting the input binary string from a hexadecimal number.

24. The method of claim 15, further comprising transforming the input binary string to a chosen x-dimensional surface.

25. The method of claim 15, further comprising selecting a decision matrix to transform the input binary string.

26. The method of claim 15, further comprising transforming the input binary string until an exit condition is met after an unknown plurality of cycles is executed during transformation.

27. The method of claim 15, further comprising storing the decision matrix and the plurality of cycles executed during transformation.

* * * * *